US011580695B2

United States Patent
Raproeger et al.

(10) Patent No.: US 11,580,695 B2
(45) Date of Patent: Feb. 14, 2023

(54) METHOD FOR A SENSOR-BASED AND MEMORY-BASED REPRESENTATION OF A SURROUNDINGS, DISPLAY DEVICE AND VEHICLE HAVING THE DISPLAY DEVICE

(71) Applicant: Robert Bosch GmbH, Stuttgart (DE)

(72) Inventors: Dirk Raproeger, Wunstorf (DE); Lidia Rosario Torres Lopez, Hildesheim (DE); Paul Robert Herzog, Hildesheim (DE); Paul-Sebastian Lauer, Hannover (DE); Uwe Brosch, Hohenhameln (DE)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 17/049,327

(22) PCT Filed: May 9, 2019

(86) PCT No.: PCT/EP2019/061953
§ 371 (c)(1),
(2) Date: Oct. 20, 2020

(87) PCT Pub. No.: WO2020/001838
PCT Pub. Date: Jan. 2, 2020

(65) Prior Publication Data
US 2021/0327129 A1 Oct. 21, 2021

(30) Foreign Application Priority Data
Jun. 30, 2018 (DE) .......................... 102018210812.9

(51) Int. Cl.
*G06T 17/05* (2011.01)
*G06T 7/70* (2017.01)
(Continued)

(52) U.S. Cl.
CPC ................ *G06T 17/05* (2013.01); *B60R 1/00* (2013.01); *G06T 7/40* (2013.01); *G06T 7/70* (2017.01);
(Continued)

(58) Field of Classification Search
CPC .. G06T 7/70; G06T 17/05; G06T 7/40; G06T 2207/20084; G06T 2207/30261;
(Continued)

(56) References Cited

U.S. PATENT DOCUMENTS

| 7,161,616 | B1 | 1/2007 | Okamoto et al. |
| 7,176,959 | B2 * | 2/2007 | Sato ........................ G01S 11/12 |
| | | | 382/104 |

(Continued)

FOREIGN PATENT DOCUMENTS

| DE | 60207655 T2 | 6/2006 |
| DE | 102008034594 A1 | 1/2010 |

(Continued)

OTHER PUBLICATIONS

International Search Report for PCT/EP2019/061953, dated Aug. 22, 2019.

*Primary Examiner* — Sath V Perungavoor
*Assistant Examiner* — Kristin Dobbs
(74) *Attorney, Agent, or Firm* — Norton Rose Fulbright US LLP; Gerard Messina

(57) ABSTRACT

A method for a sensor-based and memory-based representation of a surroundings of a vehicle. The vehicle includes an imaging sensor for detecting the surroundings. The method includes: detecting a sequence of images; determining distance data on the basis of the detected images and/or of a distance sensor of the vehicle, the distance data comprising distances between the vehicle and objects in the surroundings of the vehicle; generating a three-dimensional structure (Continued)

of a surroundings model on the basis of the distance data; recognizing at least one object in the surroundings of the vehicle on the basis of the detected images, in particular by a neural network; loading a synthetic object model on the basis of the recognized object; adapting the generated three-dimensional structure of the surroundings model on the basis of the synthetic object model and on the basis of the distance data; and displaying the adapted surroundings model.

9 Claims, 7 Drawing Sheets

(51) Int. Cl.
*H04N 5/225* (2006.01)
*B60R 1/00* (2022.01)
*G06T 7/40* (2017.01)
*G06V 20/58* (2022.01)

(52) U.S. Cl.
CPC .......... *G06V 20/58* (2022.01); *H04N 5/22525* (2018.08); *B60R 2300/10* (2013.01); *B60R 2300/20* (2013.01); *B60R 2300/30* (2013.01); *B60R 2300/60* (2013.01); *G06T 2207/20084* (2013.01); *G06T 2207/30261* (2013.01)

(58) Field of Classification Search
CPC ...... H04N 5/22525; G06V 20/58; B60R 1/00; B60R 2300/10; B60R 2300/20; B60R 2300/30; B60R 2300/60
USPC ......................................................... 348/148
See application file for complete search history.

(56) References Cited

U.S. PATENT DOCUMENTS

| 9,013,286 B2 | 4/2015 | Chen et al. | |
|---|---|---|---|
| 2014/0278065 A1* | 9/2014 | Ren | G06T 17/05 |
| | | | 701/454 |

FOREIGN PATENT DOCUMENTS

| DE | 102014208664 A1 | 11/2015 |
|---|---|---|
| EP | 1462762 A1 | 9/2004 |
| JP | H07223488 A | 8/1995 |

* cited by examiner

METHOD FOR A SENSOR-BASED AND MEMORY-BASED REPRESENTATION OF A SURROUNDINGS, DISPLAY DEVICE AND VEHICLE HAVING THE DISPLAY DEVICE

FIELD

The present invention relates to a method for a sensor-based and memory-based representation of a surroundings of a vehicle, to a display device for implementing the method, and to the vehicle having the display device.

BACKGROUND INFORMATION

European Patent Application No. EP 1 462 762 A1 describes an environment detection device for a vehicle. The environment detection device generates a virtual three-dimensional surroundings model and displays this model.

German Patent Application No. DE 10 2008 034 594 A1 relates to a method for informing an occupant of a vehicle, a representation of a surroundings of the vehicle being generated in the process.

U.S. Pat. No. 7,161,616 B1 describes a display of a synthetic image from a virtual observer perspective.

A camera of a vehicle is unable to detect areas behind objects in a surroundings of a vehicle. A representation of a rearward view of another vehicle detected by a camera from the front is not possible for the driver for example. A surroundings model ascertained solely as a function of recorded camera images, which is represented usually from a perspective at an angle from above, consequently displays the surroundings typically in an incomplete manner. Furthermore, in the case of tall and nearby objects, the conventional methods result in unnatural distortions in a displayed representation of the surroundings.

An object of the present invention is to improve the representation of a surroundings of a vehicle for a driver.

SUMMARY

The above objective may be achieved by example embodiments of the present invention.

The present invention relates to a method for a sensor-based and memory-based representation of a surroundings of a vehicle, the vehicle having at least one imaging sensor for detecting the surroundings. The imaging sensor preferably has a camera. In accordance with an example embodiment of the present invention, the method comprises a recording of a series of images by the imaging sensor. Subsequently, distance data are determined as a function of the recorded images, in particular a two-dimensional depth map and/or a three-dimensional point cloud. Alternatively or additionally, the distance data, in particular the two-dimensional depth map and/or the three-dimensional point cloud, are determined as a function of distances between objects in the surroundings and the vehicle detected by at least one distance sensor of the vehicle. The optional distance sensor comprises an ultrasonic sensor, radar sensor and/or lidar sensor. The distance data represent the detected and/or ascertained distances between the vehicle and objects in the surroundings of the vehicle. The determination of distances from the vehicle or of the distance data using an active distance sensor, for example using the lidar sensor and/or using the radar sensor and/or using ultrasonic sensors, has the fundamental advantage over a camera-based distance determination that distances are reliably detected even in poor lighting conditions and/or poor weather conditions. There may be a provision for performing a selection of a sensor type, e.g., camera and/or ultrasonic sensor and/or lidar sensor and/or radar sensor for determining the distance data as a function of lighting conditions and/or weather conditions and/or a vehicle speed. Subsequently, in a further method step, a three-dimensional structure of a surroundings model is generated as a function of the determined distance data, in particular of the depth map and/or the determined point cloud. The structure of the surroundings model comprises in particular a three-dimensional grid. Furthermore, at least one object in the surroundings of the vehicle is recognized on the basis of the detected images. The object is preferably recognized by a first neural network and/or by another type of artificial intelligence or another classification method, for example by a support vector machine or boosted trees. For example, vehicles, pedestrians, infrastructure objects, such as for example a traffic light, and/or buildings are recognized as objects. Optionally, the first neural network additionally ascertains or recognizes an object class of the detected object and/or an object species of the detected object. There may be a provision for example that a vehicle class of a subcompact car is recognized as the object class and/or a manufacturer model of the subcompact car is recognized as the object species. Thereupon, a synthetic object model is loaded from an electrical memory as a function of the detected object, the memory being situated for example within a control unit of the vehicle. Optionally, the object model is loaded additionally as a function of the detected object class and/or the detected object species. The synthetic object model may be a specific object model, which represents the detected object, or a generic object model. The generic object model is parameterizable or is modified on the basis of the recognized object and/or of the recognized object class and/or of the detected object species and/or on the basis of the distance data. Thereupon, the generated three-dimensional structure of the surroundings model is adapted on the basis of the loaded synthetic object model and of the distance data, the synthetic object model replacing or expanding a structural area of the generated surroundings model. In other words, the generated surroundings model is expanded by the loaded object models on the basis of the detected and/or ascertained distances. This surroundings model adapted with the addition of the synthetic object model is displayed to the driver, the display preferably occurring on a display screen of the vehicle and/or on a display screen of a mobile electronic device. The method advantageously makes it possible to reduce unnatural distortions in a view of the surroundings model so that the displayed surroundings model appears more realistic and error-free. Furthermore, on account of the adaptation of the surroundings model by the use of object models from the memory, areas in the surroundings model that are not visible for a camera are represented realistically, for example a view of another vehicle not recorded by a camera. On account of the method, the driver is moreover better and more quickly able to estimate a driving situation, a distance from an object or a parking space, which additionally increases the driving comfort for the driver.

In a preferred development of the present invention, an object orientation of the recognized object is ascertained on the basis of the detected images, the object orientation being recognized in particular by a second neural network and/or by another type of artificial intelligence or another classification method. In this development, the generated three-dimensional structure of the surroundings model is adapted additionally on the basis of the ascertained object orientation. As a result, the adaptation of the generated surroundings model is advantageously performed more quickly and more reliably.

In a particularly preferred development of the present invention, segments or object instances are recognized in the surroundings of the vehicle on the basis of the detected images. The recognition of the segments or object instances preferably occurs with the aid of a third neural network and/or another type of artificial intelligence or another classification method. Subsequently, the distances or depth information in the distance data are assigned to the recognized segment or the recognized object instance. In this development, the adaptation of the generated three-dimensional structure of the surroundings model occurs additionally on the basis of the recognized segments or object instances, in particular on the basis of the segments or object instances assigned to the distances. As a result, the adaptation of the generated three-dimensional structure of the surroundings model on the basis of the loaded synthetic object model is advantageously performed more precisely and more quickly.

In a further development of the present invention, a texture is ascertained for the adapted three-dimensional structure of the surroundings model on the basis of the detected images, the detected images preferably being camera images. Subsequently, the adapted surroundings model is displayed with the ascertained texture. For example, a color of a vehicle in the surroundings model is ascertained. There may be a provision for the ascertained texture to comprise detected camera images or perspectively modified camera images. As a result of this further development, the surroundings model is displayed with realistic imaging and/or coloring, which facilitates easy orientation for the driver. Optionally, the ascertainment of the texture for the structural area of the surroundings model adapted by the loaded object model is loaded or ascertained from the memory, in particular on the basis of the recognized object or a recognized object class or a recognized object species. For example, the texture of a manufacturer model of a vehicle is loaded from the electronic memory if a corresponding object species was recognized. This development gives the surroundings model a realistic appearance for the driver. Moreover, it prevents unnatural distortions in the texture.

In a preferred development of the present invention, the display of the adapted surroundings model occurs within a specified area around the vehicle. In other words, the surroundings model is represented only within an area that is delimited by a specified distance around the vehicle. The specified distance around the vehicle is preferably smaller than or equal to 200 meters, preferably 50 meters, in particular smaller than or equal to 10 meters. The specified area is defined for example by a base area of the specified area, which represents the specified distance or the specified area. A center point of the base area represents in particular a center point of the vehicle. The base area may have any shape, the base area preferably having a square, elliptical or circular shape. This advantageously reduces the computing expenditure for generating the surroundings model as well as the computing expenditure for adapting the surroundings model. Furthermore, this development advantageously achieves a low rate of unnatural distortions in the texture of the displayed surroundings model.

There may be a provision for a size of the specified area and/or a shape of the specified area and/or an observer perspective of the displayed surroundings model to be adapted as a function of a vehicle speed and/or a steering angle of the vehicle and/or the distance data or as a function of a detected distance from an object.

Another development of the present invention provides for the display of at least one projection area outside of the adapted surroundings model, which is situated at least partially vertically with respect to a base area of the specified area. At least one subarea of the currently detected image is projected onto this projection area, in particular a subarea of a detected camera image. The images represented on the displayed projection area represent a view of a distant surroundings, that is, of an area of the surroundings that lies at a distance outside of the displayed surroundings model and further than the specified distance that delimits the specified area.

In a further development of the present invention, the projection area is displayed as a function of the vehicle speed and/or the steering angle of the vehicle and/or the distance data or as a function of a detected distance from an object. This means that in the event of a parking process advantageously no far-range view is shown on the projection area and consequently the computing expenditure is minimized in this driving situation. Alternatively or additionally, a size and/or a shape of the projection area may be adapted as a function of the vehicle speed and/or of the steering angle of the vehicle and/or of the distance data. Advantageously, this makes it possible, for example when driving at a higher speed, to display to the driver a narrow section of the surrounding area lying ahead in the direction of travel, which minimizes the computing expenditure in a driving situation at a higher speed and focuses the attention of the driver to the area essential in this driving situation.

The present invention also relates to a display device having a display, which is designed to carry out a method according to the present invention. The display device preferably has an imaging sensor, in particular a camera, and a control unit. The control unit is designed to carry out the method according to the present invention, that is to say, to detect the images, to generate and adapt the displayed surroundings model and to control the display for displaying the adapted surroundings model.

The present invention also relates to a vehicle comprising the display device.

Further advantages are yielded by the description below of exemplary embodiments with reference to the figures.

DETAILED DESCRIPTION OF EXAMPLE EMBODIMENTS

Figure 1:
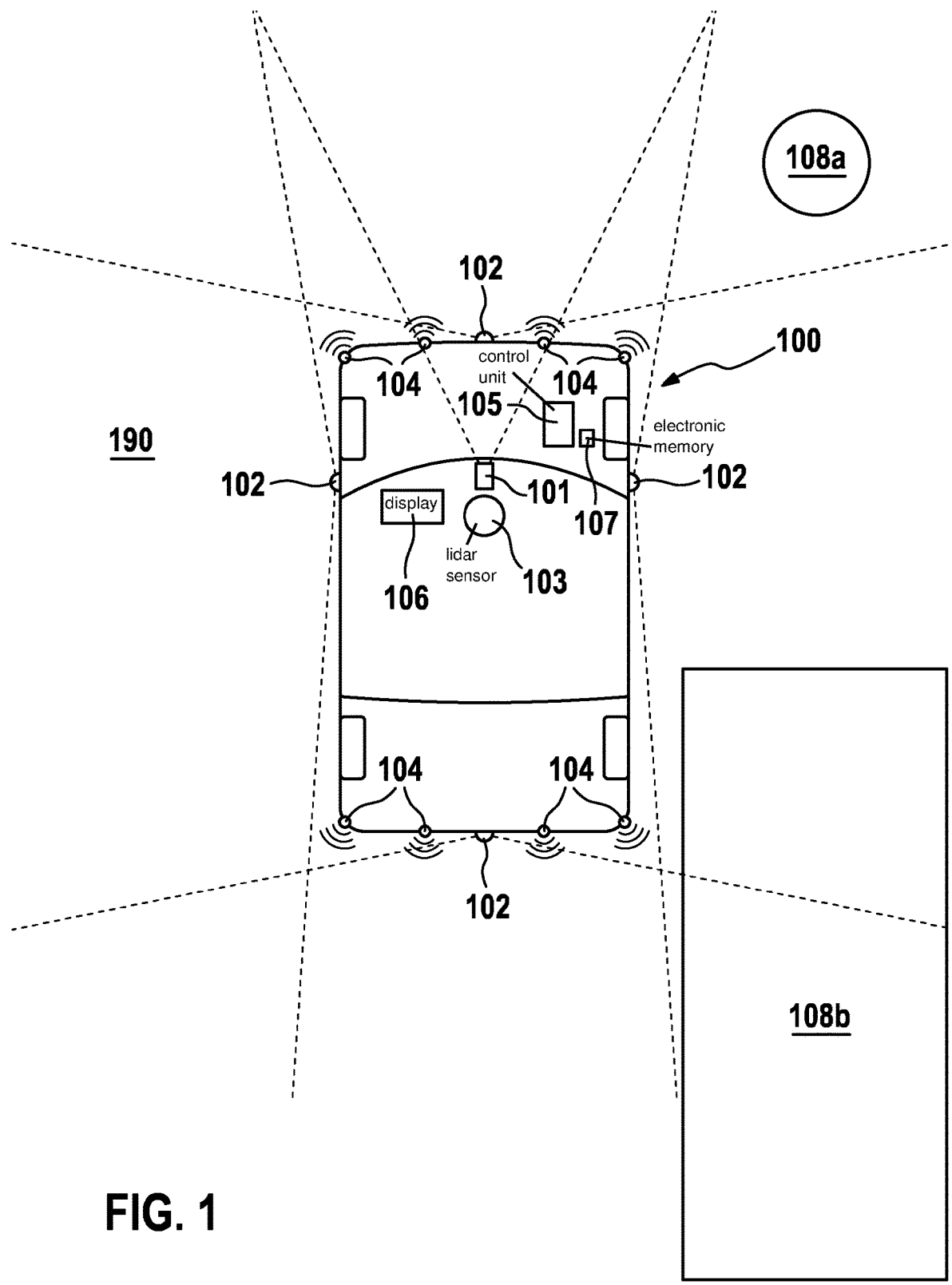
FIG. 1 show a vehicle in accordance with an example embodiment of the present invention.

FIG. 1 shows a top view of a vehicle 100 in accordance with an example embodiment of the present invention. Vehicle 100 has a forward-facing camera 101 as an imaging sensor. Furthermore, wide-angle cameras 102 are situated on vehicle 100 as imaging sensors at the front, at the rear as well as on each side of the vehicle, which detect the surroundings 190 of the vehicle. Vehicle 100 furthermore has distance sensors 103 and 104, where the distance sensors may a lidar sensor 103 in this exemplary embodiment, which may also be an imaging sensor, and multiple ultrasonic sensors 104, which may also be imaging sensors. Alternatively or additionally, a radar sensor may also be situated on the vehicle, which may also be an imaging sensor. Lidar sensor 103 and ultrasonic sensors 104 are designed to detect distances between vehicle 100 and objects 108*a* and 108*b* in the surroundings of vehicle 100. Vehicle 100 moreover has a control unit 105, which records the images detected by the camera and the distances detected by lidar sensor 103 and/or ultrasonic sensors 104. Control unit 105 is furthermore designed to control a display 106 in vehicle 100 for displaying a visual representation of the surroundings for the driver, in particular for displaying a surroundings model generated and adapted by the control unit and, if indicated, projection areas outside of the surroundings model. To calculate the surroundings model, control unit 105 loads data, in particular synthetic and/or generic object models, from an electrical memory 107 of vehicle 100 and/or from an electrical memory of control unit 105.

Figure 2:
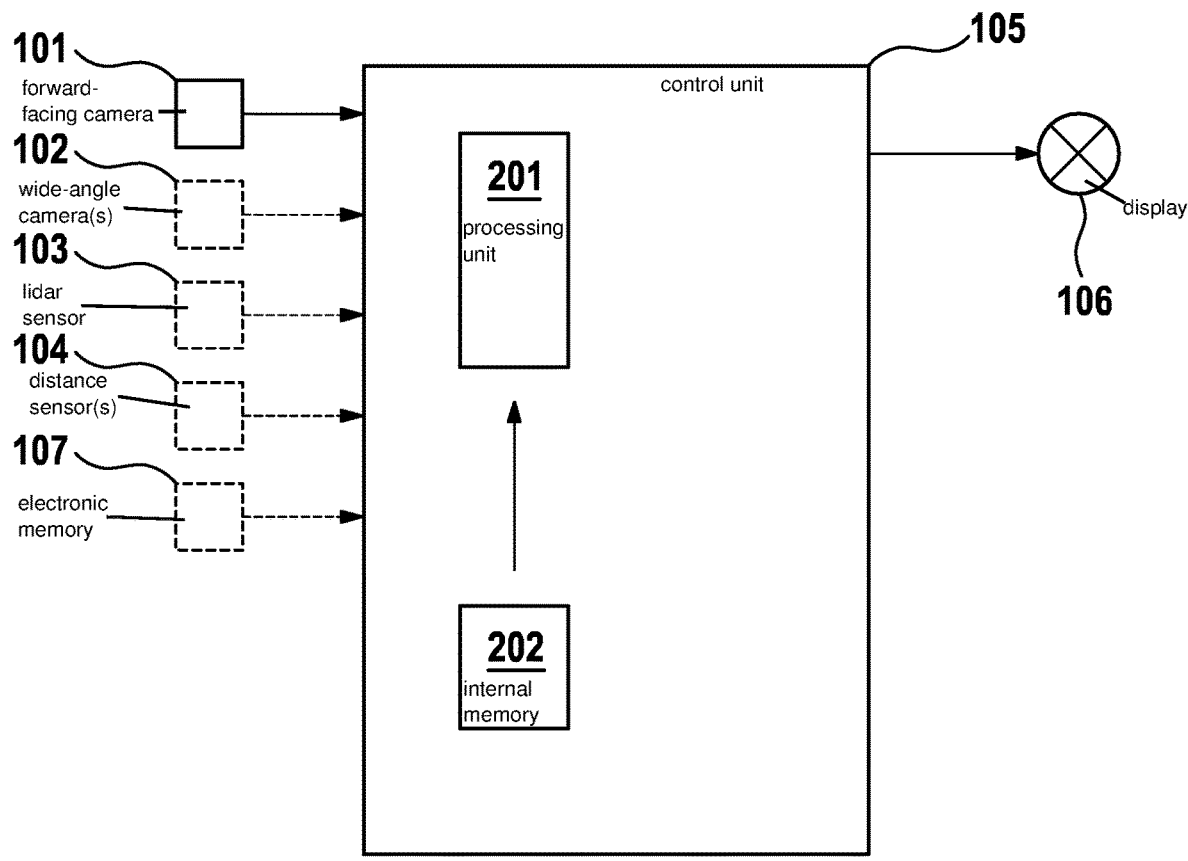
FIG. 2 shows a control unit in accordance with an example embodiment of the present invention.

FIG. 2 shows control unit 105 as a block diagram in accordance with an example embodiment of the present invention. Control unit 105 detects at least one sequence of images using camera 101 and/or optionally using multiple wide-angle cameras 102 and/or using lidar sensor 103. Furthermore, control unit 105 may optionally detect distances using lidar sensor 103 and/or ultrasonic sensors 104. Control unit 105 is designed to load data from external memory 107 and/or from internal memory 202 of the control unit. Processing unit 201 of control unit 105 calculates a surroundings model on the basis of the detected images and/or the detected distances, which are combined in distance data, in particular in a specific depth map and/or a specific point cloud, and/or on the basis of the data from memory 107 and/or 202. Control unit 105 is furthermore designed to control a display 106 for displaying a representation of the surroundings of vehicle 100, the calculated representation being in particular the adapted surroundings model, it being possible to supplement the display with further information, for example driving dynamics parameters, such as a vehicle speed, and/or a projection area.

Figure 3:
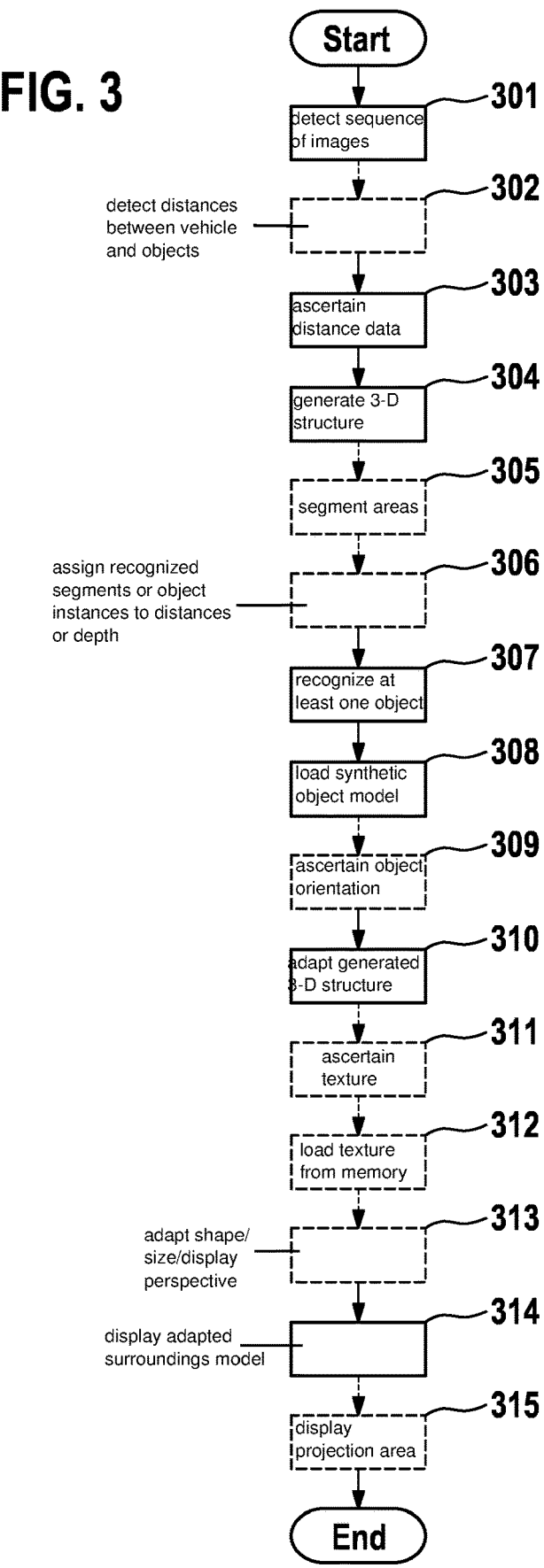
FIG. 3 shows a flow chart of a method according to an example embodiment of the present invention.

FIG. 3 shows by way of example a flow chart of a method in accordance with an example embodiment of the present invention as a block diagram. The method begins with a detection 301 of a sequence of images using an imaging sensor, in particular a camera 101 and/or 102. Optionally, in a step 302, distances between vehicle 100 and objects in the surroundings of vehicle 100 are detected using at least one distance sensor 103 and/or 104. Subsequently, in a step 303, distance data, in particular a two-dimensional depth map and/or a three-dimensional point cloud, are ascertained on the basis of the detected images and/or on the basis of the detected distances. Distance data, in particular the depth map and/or the point cloud, comprise the detected or ascertained distances of vehicle 100 from objects 108*a*, 108*b* in the surroundings of vehicle 100. The distance data are ascertained for example on the basis of the detected sequence of the images, in particular on the basis of an evaluation of an optical flow between detected camera images. Every distance of the distance data or every point of the depth map and/or of the point cloud represents for example an ascertained distance between vehicle 100 and objects 108*a*, 108*b* in the surroundings of vehicle 100. Alternatively or additionally, step 303 may provide for the distance data to be ascertained on the basis of images detected by a stereo camera. Alternatively, the distance data or the depth map and/or the point cloud are determined in step 303 on the basis of sensor systems 101, 102, 103 and/or 104 that are independent of one another. Additionally, there may be a provision for the distance data or the depth map and/or the point cloud to be ascertained on the basis of a time characteristic of data of a sensor system 101, 102, 103 and/or 104. For ascertaining the distance data, ultrasonic sensors 104 have for example the specific advantage compared to a camera 101, 102 that the detected distances are relatively independent of bad light and/or weather conditions. In a step 304, a three-dimensional structure of a surroundings model is generated on the basis of the distance data, in particular of the depth map and/or the point cloud, the three-dimensional structure comprising in particular a three-dimensional grid, the three-dimensional grid preferably simplifying or representing the distance data. In an optional step 305, the areas of the surroundings detected in an image are segmented based on a sequence of the detected images. For example, a segment or an object instance "roadway," a segment "object," a segment "building" and/or a segment "infrastructure object" are recognized. In an optional step 306, the recognized segments or object instances are assigned to the distances or the depth information in the distance data. In a step 307, at least one object in the surroundings of the vehicle is recognized on the basis of the detected images. This recognition is performed using a first neural network trained for this purpose. In a subsequent step 308, a synthetic object model is loaded from memory 107 and/or 202 as a function of the recognized object. In an optional step 309, an object orientation of the recognized object is ascertained on the basis of the detected images, preferably by a second neural network. The object orientation may represent a first approximation of the orientation of the object, a category of a relative orientation of the recognized object with respect to the vehicle being ascertained for example from a set comprising the categories "forward object orientation," "object orientation toward the right" and/or "object orientation toward the left." Thereupon, in a further method step 310, the generated three-dimensional structure of the surroundings model is adapted as a function of the synthetic object model and of the distance data, the synthetic object model replacing or adapting a structural area of the generated surroundings model. The adaptation 310 of the generated three-dimensional structure of the surroundings model may occur preferably additionally as a function of the ascertained object orientation. Subsequently, in an optional step 311, a texture is ascertained for the adapted three-dimensional structure of the surroundings model on the basis of the detected images. An ascertainment 311 of the texture for adapted structural areas of the surroundings model is not performed if a texture for this adapted structural area is loaded from the memory in an optional step 312. In a further optional step 313, a shape of a specified area, a size of the specified area and/or a display perspective of the adapted surroundings model is adapted as a function of a vehicle speed, a steering angle of the vehicle, a detected distance between the vehicle and an object and/or the current light conditions and/or the current weather conditions and/or as a function of the selected sensor type for generating the distance data, the specified area being represented for example by a base area. Subsequently, the adapted surroundings model is displayed 314, the ascertained and/or loaded texture being optionally displayed on the three-dimensional structure of the adapted surroundings model. The display 314 of the adapted surroundings model occurs within the specified area or the base area of the specified area around vehicle 100. In a further step 315, there may be a provision for displaying a projection area outside the adapted surroundings mode, which is situated at least partially vertically with respect to a base area of the specified area, at least one subarea of a detected image, in particular of a camera image, being projected onto this projection area. A size and a shape of the projection area may be optionally adapted as a function of the vehicle speed, of the steering angle and/or of the distance data.

Figure 4:
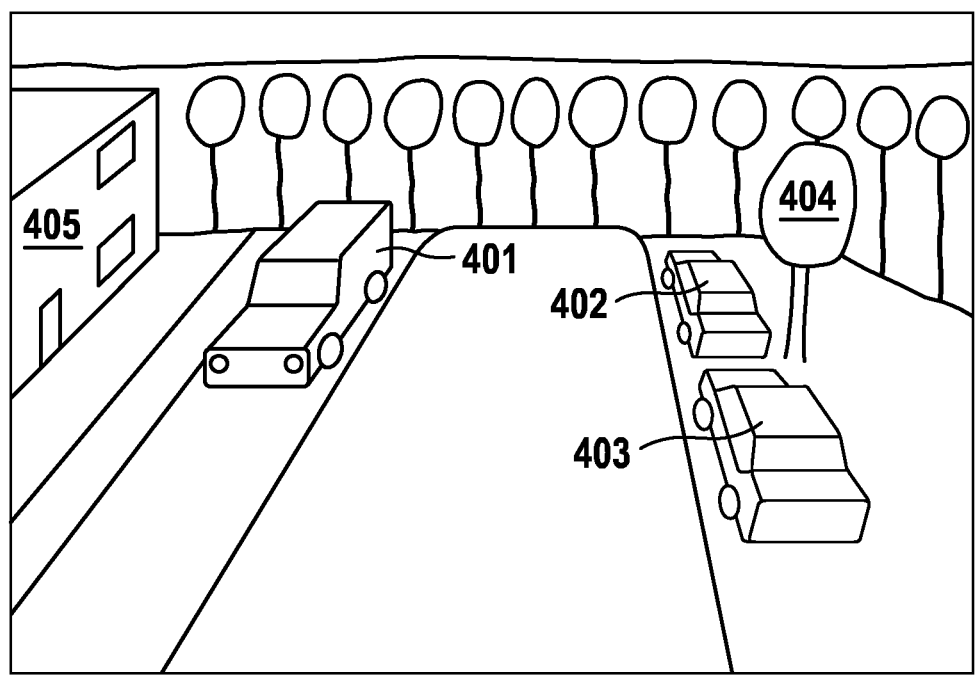
FIG. 4 shows an image with recognized objects in accordance with an example embodiment of the present invention.

FIG. 4 shows as the image a detected camera image of the forward-facing front camera 101 of the vehicle including the objects 401, 402, 403, 404 and 405 detected by step 307. The objects 401, 402, 403, 404 and 405 are recognized by at least one first neural network trained for this purpose. An object class may be recognized or assigned to the recognized objects, for example vehicle 401, 402 and 403, building 405 or tree 404.

Figure 5:
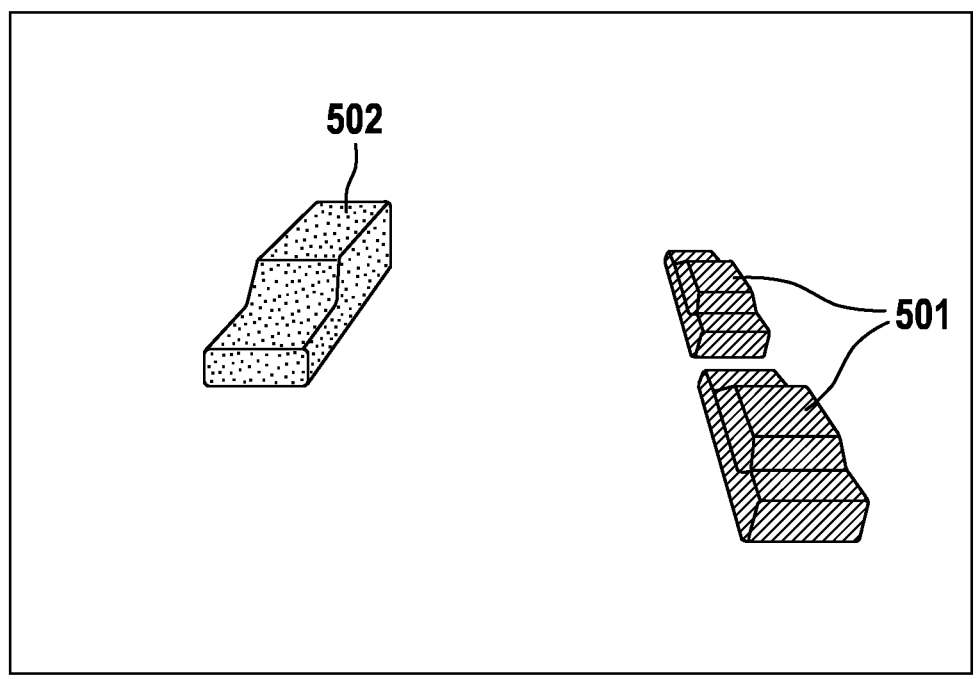
FIG. 5 shows recognized object orientation on the basis of the image from FIG. 4 in accordance with an example embodiment of the present invention.

FIG. 5 shows the object orientations 501 and 502, detected in step 309, of the recognized objects 401, 402 and 403 on the basis of the camera image shown in FIG. 4 by dashed lines for the category 501 "forward object orientation" and by a dotted line for the category 502 "rearward object orientation," the object orientations 501 and 502 having been recognized by at least one second neural network trained for this purpose.

Figure 6:
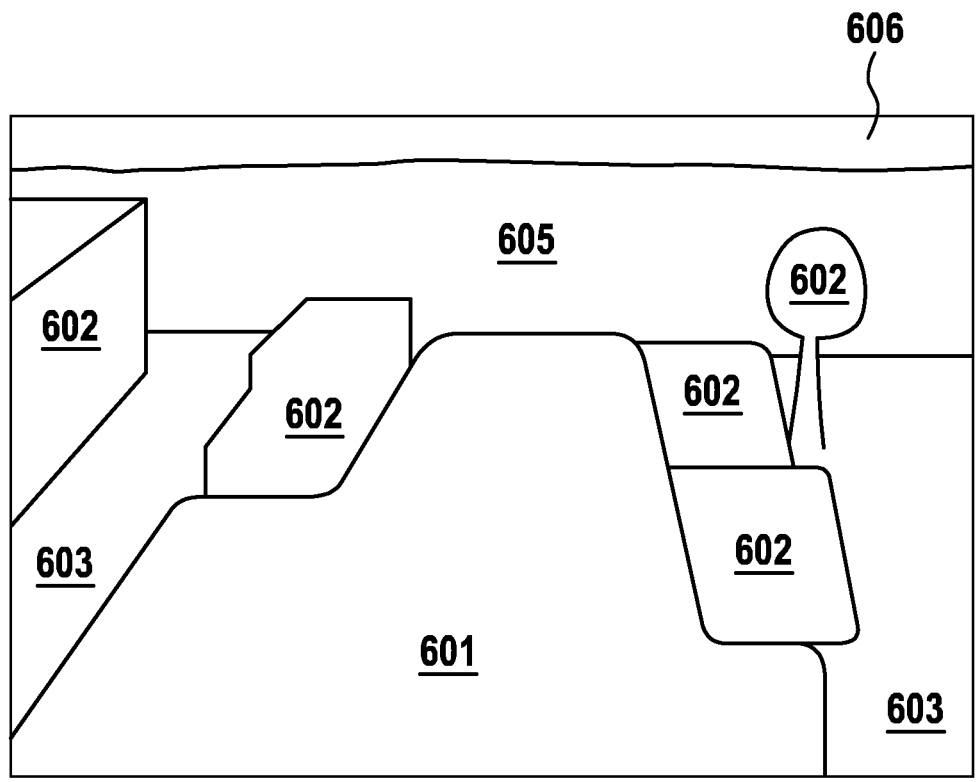
FIG. 6 shows recognized segments on the basis of the image from FIG. 4 in accordance with an example embodiment of the present invention.

FIG. 6 shows the segments or object instances 601, 602, 603, 605 and 606 recognized in step 305 on the basis of the camera image shown in FIG. 4 or a series of camera images, segments 601, 602, 603, 605 and 606 having been recognized by at least one third neural network trained for this purpose. Segment 601 represents for example an area in which the vehicle is able to drive. Segment 602 represents an object area and segment 603 represents an area in which a vehicle is not able to drive. A green space area is represented by segment 605 and a sky area is represented by segment 606. The first neural network and/or the second neural network and/or the third neural network may be replaced by a more general neural network or by a recognition method or by a classification method or by an artificial intelligence, which recognizes objects, object orientations as well as segments.

Figure 7:
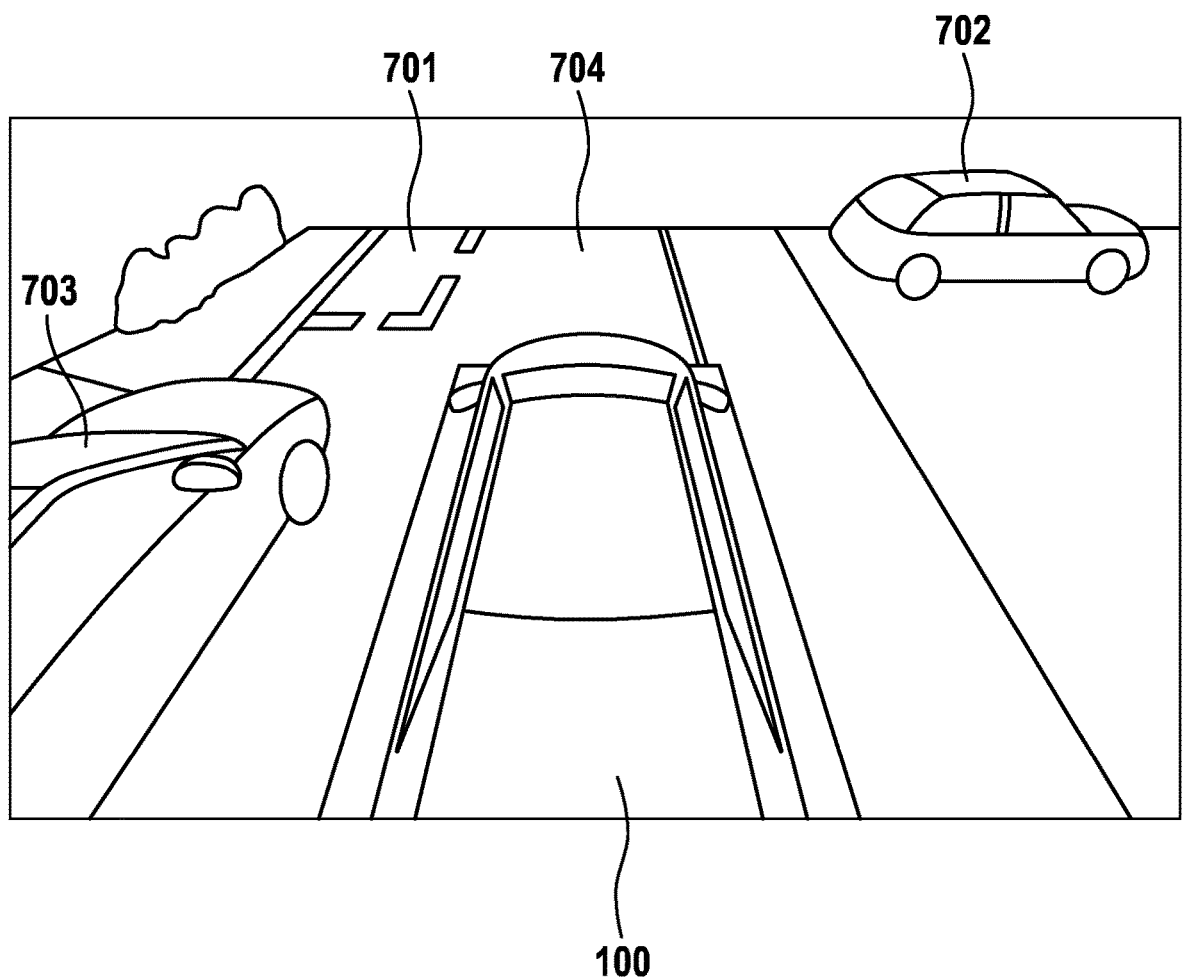
FIG. 7 shows an example of a displayed surroundings model in accordance with an example embodiment of the present invention.

FIG. 7 shows a displayed surroundings model 701. Vehicles were recognized as objects in step 307, as a result of which the surroundings model was respectively adapted by an object model 702 and 703. In other words, the object models 702 and 703 were inserted into surroundings model 701 on the basis of the recognized objects, the recognized object orientation and the recognized segments or the surroundings model was adapted by the object models 702 and 703. Object model 701 accordingly has a structure adapted by two object models 702 and 703. In FIG. 7, the adapted surroundings model 701 is displayed only within a specified square area 704 around a center point of vehicle 705, vehicle 100 having also been inserted into the surroundings model as an additional object model.

Additional projection areas 802 may be situated at the edge and outside of the displayed surroundings model 701. A subarea of the detected images, in particular detected camera images may be displayed on these projection areas 802. The subareas of the images displayed on projection areas 802 represent a distant view for a driver.

Figure 8:
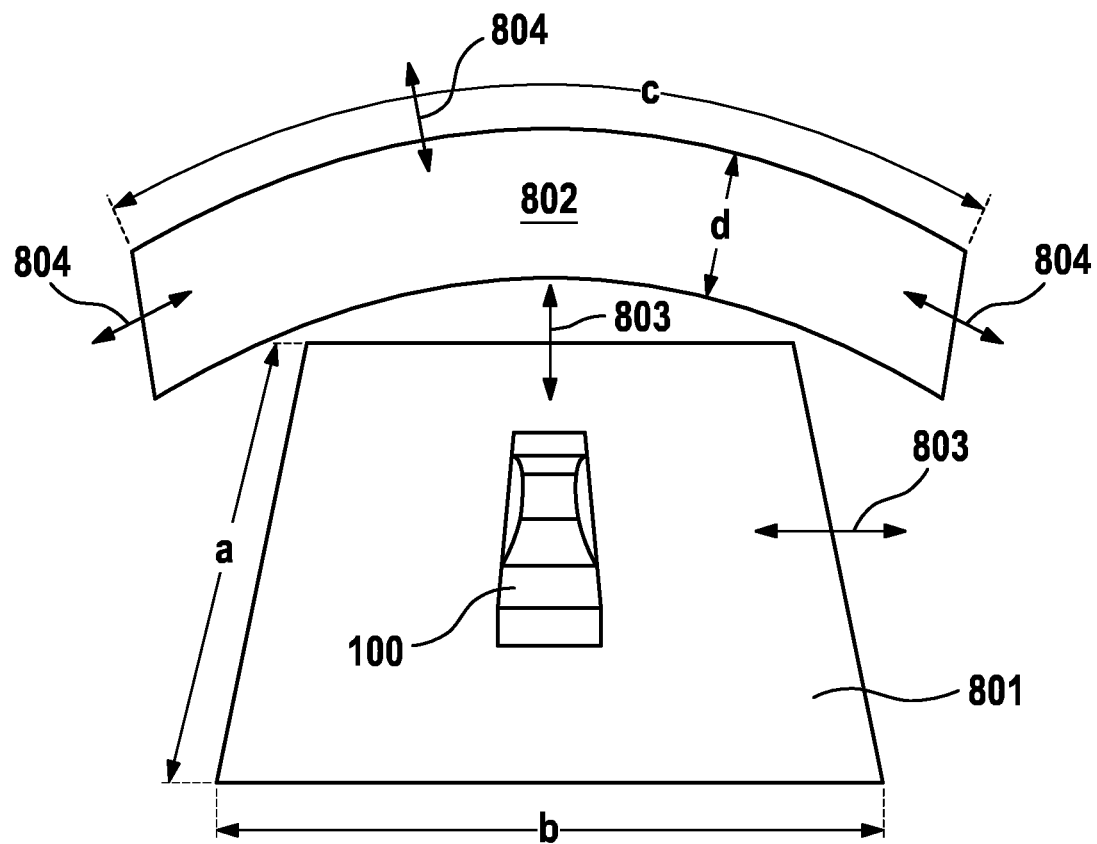
FIG. 8 a base area of the specified area for representing the surroundings model and projection area in accordance with an example embodiment of the present invention.

FIG. 8 shows a vehicle 100 including a specified area around the vehicle, which is represented by a base area 801 of the specified area, and a projection area 802. In this exemplary embodiment, the base area 801 of the specified area is shown in perspective and is square. Alternatively, the shape of the base area could also be elliptical or circular. Alternatively, the display may also occur from a perspective perpendicular from above or at an angle from the side. The shape of base area 801 of the specified area and/or the length a and/or the width b of base area 801 of the specified area are adapted for example as a function of the vehicle speed and/or of the weather conditions and/or of the visibility conditions, for example of a brightness or time of day. The adaptation of the length a and/or of the width b of base area 801 of the specified area is symbolized in FIG. 8 by arrows 803. Projection area 802 is curved in this exemplary embodiment and stands vertically or perpendicularly with respect to base area 801 of the specified area. Alternatively, projection area 802 may be situated as a non-curved plane on at least one side of base area 801 of the specified area, it being possible for example for a projection area 802 to be situated on each side of base area 801. Furthermore, in another exemplary embodiment, projection area 802 may be situated around 360° and closed or as a cylindrical lateral surface around base area 801 or around the specified area. The length c and/or the height d of projection area 802 are adapted for example as a function of the vehicle speed. The adaptation of the length c and/or of the height d of projection area 802 is symbolized in FIG. 8 by arrows 804. Base area 801 is preferably also displayed as part of the surroundings model, the base area being ascertained in particular on the basis of the detected images and/or of the distance data, in particular of the depth map and/or of the point cloud, so that base area 801 reproduces for example areas of unevenness of a roadway.

What is claimed is:

1. A method for a sensor-based and memory-based representation of a surroundings of a vehicle, the vehicle including at least one imaging sensor configured to detect the surroundings, the at least one imaging sensor including at least one camera, the method comprising the following steps:
   detecting a sequence of images, the images being camera images;
   determining distance data based on the detected images and/or based on a distance sensor of the vehicle, the distance data including distances between the vehicle and objects in the surroundings of the vehicle;
   generating a three-dimensional structure of a surroundings model based on the distance data;
   recognizing, by a neural network, at least one object in the surroundings of the vehicle based on the detected images;
   loading a synthetic object model based on the recognized object;
   adapting the generated three-dimensional structure of the surroundings model based on the synthetic object model and based on the distance data, the synthetic object model replacing a structural area of the generated surroundings model;

ascertaining a texture for the adapted three-dimensional structure of the surroundings model as a function of the detected images, the ascertainment of the texture for the structural area of the surroundings model being adapted by the loaded object model being loaded from the memory as a function of the recognized object; and displaying the adapted surroundings model with the ascertained texture.

2. The method as recited in claim 1, further comprising the following steps:

ascertaining, by the neural network, an object orientation of the recognized object based on the detected images; and adapting the generated three-dimensional structure of the surroundings model additionally based on the ascertained object orientation.

3. The method as recited in claim 1, further comprising the following steps:

recognizing, by the neural network, an object instance in the surroundings of the vehicle based on the detected images;

assigning the distances in the distance data to a recognized object instance; and adapting the generated three-dimensional structure of the surroundings model additionally based on the object instance assigned to the distance data.

4. The method as recited in claim 1, wherein the adapted surroundings model displayed corresponds to a specified area around the vehicle.

5. The method as recited in claim 4, wherein a size of the specified area and/or a shape of the specified area and/or a display perspective of the adapted surroundings model, is adapted based on a vehicle speed and/or the distance data.

6. The method as recited in claim 1, wherein the adapted surroundings model displayed corresponds to a specified area around the vehicle, the method further comprising:

displaying a projection area outside the adapted surroundings model, which is situated at least partially perpendicularly with respect to a base area of the specified area, at least one subarea of a detected image being projected onto the projection area, wherein the vehicle is present in the adapted surroundings model and outside of the projection area.

7. The method as recited in claim 6, wherein the display of the projection area occurs as a function of a vehicle speed and/or the distance data.

8. A display device for a sensor-based and memory-based representation of a surroundings of a vehicle, the vehicle including at least one imaging sensor configured to detect the surroundings, the at least one imaging sensor including at least one camera, the display device configured to:

detect a sequence of images, the images being camera images;

determine distance data based on the detected images and/or based on a distance sensor of the vehicle, the distance data including distances between the vehicle and objects in the surroundings of the vehicle;

generate a three-dimensional structure of a surroundings model based on the distance data;

recognize, using a neural network, at least one object in the surroundings of the vehicle based on the detected images;

load a synthetic object model based on the recognized object;

adapt the generated three-dimensional structure of the surroundings model based on the synthetic object model and based on the distance data the synthetic object model replacing a structural area of the generated surroundings model;

ascertain a texture for the adapted three-dimensional structure of the surroundings model as a function of the detected images, the ascertainment of the texture for the structural area of the surroundings model being adapted by the loaded object model being loaded from the memory as a function of the recognized object; and display the adapted surroundings model with the ascertained texture.

9. A vehicle, comprising:

at least one imaging sensor configured to detect surroundings of the vehicle, the imaging sensor including at least one camera; and a display device for a sensor-based and memory-based representation of the surroundings of the vehicle, the display device configured to:

detect a sequence of images, the images being camera images;

determine distance data based on the detected images and/or based on a distance sensor of the vehicle, the distance data including distances between the vehicle and objects in the surroundings of the vehicle;

generate a three-dimensional structure of a surroundings model based on the distance data;

recognize, using a neural network, at least one object in the surroundings of the vehicle based on the detected images;

load a synthetic object model based on the recognized object;

adapt the generated three-dimensional structure of the surroundings model based on the synthetic object model and based on the distance data the synthetic object model replacing a structural area of the generated surroundings model;

ascertain a texture for the adapted three-dimensional structure of the surroundings model as a function of the detected images, the ascertainment of the texture for the structural area of the surroundings model being adapted by the loaded object model being loaded from the memory as a function of the recognized object; and display the adapted surroundings model with the ascertained texture.

* * * * *